United States Patent [19]
Gelikonov et al.

[11] Patent Number: 5,835,642
[45] Date of Patent: Nov. 10, 1998

[54] OPTICAL FIBER INTERFEROMETER AND PIEZOELECTRIC MODULATOR

[75] Inventors: Valentin M. Gelikonov; Grigory V. Gelikonov; Natalia D. Gladkova; Vladimir I. Leonov; Felix I. Feldchtein; Alexander M. Sergeev; Yakov I. Khanin, all of Nizhny Novgorod, Russian Federation

[73] Assignee: Optical Coherence Technologies, Inc., Cleveland, Ohio

[21] Appl. No.: 816,965

[22] Filed: Mar. 3, 1997

Related U.S. Application Data

[62] Division of Ser. No. 602,589, Feb. 16, 1996, abandoned.

[30] Foreign Application Priority Data

Mar. 1, 1995 [RU] Russian Federation ................................................................ 9510292125005536

[51] Int. Cl.$^6$ .................................................. G02F 1/295
[52] U.S. Cl. .................................... 385/4; 385/1; 385/12; 356/345; 356/73.1
[58] Field of Search ................................. 385/4, 3, 1, 11, 385/12; 356/345, 358, 73.1, 346, 351

[56] References Cited

U.S. PATENT DOCUMENTS

| | | |
|---|---|---|
| 4,703,287 | 10/1987 | Fournier, Jr. et al. . |
| 5,056,885 | 10/1991 | Chinn ..................................... 385/16 X |
| 5,202,745 | 4/1993 | Sorin et al. ............................. 356/73.1 |
| 5,313,266 | 5/1994 | Keolian et al. . |
| 5,321,501 | 6/1994 | Swanson et al. ....................... 356/345 |
| 5,459,570 | 10/1995 | Swanson et al. ....................... 356/345 |

FOREIGN PATENT DOCUMENTS

| | | |
|---|---|---|
| 0 356 056 A1 | 2/1990 | European Pat. Off. . |
| 0 362 474 B1 | 4/1990 | European Pat. Off. . |
| 0 460 635 A2 | 12/1991 | European Pat. Off. . |
| 42 04 521 C | 6/1993 | Germany . |
| A 2191596 | 12/1987 | United Kingdom . |
| 2221999 | 2/1990 | United Kingdom ....................... 385/4 |
| A 2221999 | 2/1990 | United Kingdom . |
| A 2234828 | 2/1991 | United Kingdom . |

OTHER PUBLICATIONS

K. Takada, et al., "New measurement system for fault location in optical waveguide devices based on an interferometric technique", *Applied Optics*, vol. 26, No. 9 (May 1, 1987) pp. 1603–1606.

Spravochnik VOLS. "Volokonnye opticheskie linu soyazi", 1998, Technika, (Kiev), pp. 34–35.

(List continued on next page.)

*Primary Examiner*—Phan T. H. Palmer
*Attorney, Agent, or Firm*—Pearne, Gordon, McCoy & Granger

[57] ABSTRACT

The invention is related to technical physics, in particular to devices for investigating the internal structure of objects and can be used in medicine for diagnostics of human organs and systems, in particular for optical coherence tomography and in technical diagnostics, for example technological process control. The invention relates to the creation of an optical-fiber interferometer, which, being used in a device for optical coherence tomography, allows one to investigate media with short time of changing of optical characteristics or its position relative to the optical probe, for example biotissues in vivo. The invention also relates to the creation of a piezoelectric modulator, suitable for use in the interferometer and for providing the necessary scanning depth in the mentioned media. In the described optical fiber interferometer the piezoelectric modulator, constructed as a fiber optic piezoelectric controllable delay line, performs a function of the fiber part of the interferometer arm which allows one to change practically inertialess the optical path in the interferometer arm and consequently an optical path difference at least to several tens of the working wavelenghts. The described piezoelectric modulator is constructed as a fiber optic piezoelectric controllable delay line and contains a piezoelectric plate with electrodes and an optical fiber situated on its opposite sides. It is expedient to make the plate in a disk form and to put the fiber as a spiral which allows one to change the optical path in a wide range while keeping the modulator inertialess and compact.

21 Claims, 2 Drawing Sheets

OTHER PUBLICATIONS

C. Hitzenberger, "Optical Measurement of the Axial Eye Length by Laser Doppler Interferometry", *Investigative Opthalmology & Visual Science*, vol. 32, No. 3 (Mar. 1991) pp. 616–624.

X. Clivaz, et al. "High–resolution reflectometry in biological tissues", *Optics Letters*, vol. 17, No. 1, Jan. 1, 1992, pp. 4–6.

J. A. Izatt, et al., "Micron–resolution biomedical imaging with optical coherence tomography", *Optics & Photonics News*, vol. 4, No. 10, Oct. 1993, pp. 14–19.

E. A. Swanson, et al, "In vivo retinal imaging by optical coherence tomography", *Optics Letters*, vol. 18, No. 21, Nov. 1, 1993, pp. 1864–1866.

A. Sergeev, et al., "In vivo optical coherence tomography of human skin microstructure", *Proc. SPIE*, v. 2823, 1994, pp. 144–150.

J. A. Izatt, et al. "Optical coherence microscopy in scattering media", *Optics Letters*, vol. 19, No. 8, Apr. 15, 1994, pp. 590–592.

A. Sergeev, et al. "High–spatial–resolution optical–coherence tomography of human skin and mucous membranes", *CLEO '95 Technical Digest*, 1995, p. 349, No month.

V. M. Gelikonov, et al., "Coherent optical tomography of microscopic inhomogeneities in biological tissues", *JETP Lett.*, vol. 61, No. 2, Jan. 25, 1995, pp. 158–162.

X. J. Wang, et al., "Characterization of human scalp hairs by optical low–coherence refectometry", *Optics Letters*, vol. 20, No. 6, Mar. 15, 1995, pp. 524–526.

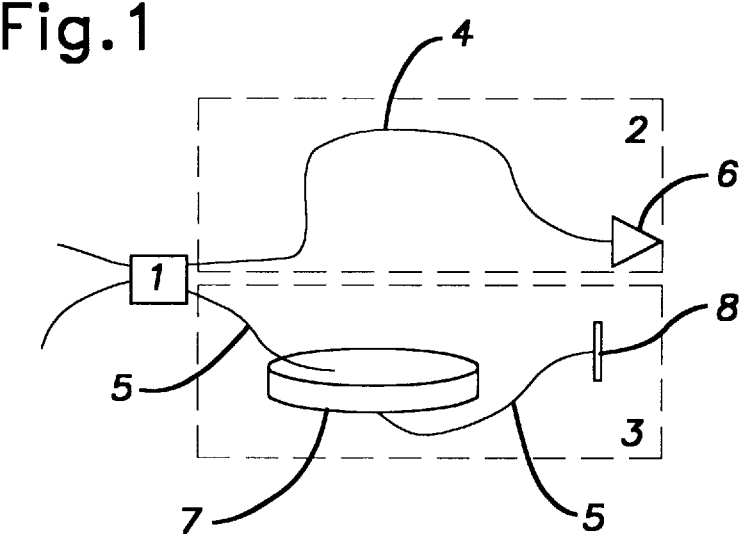
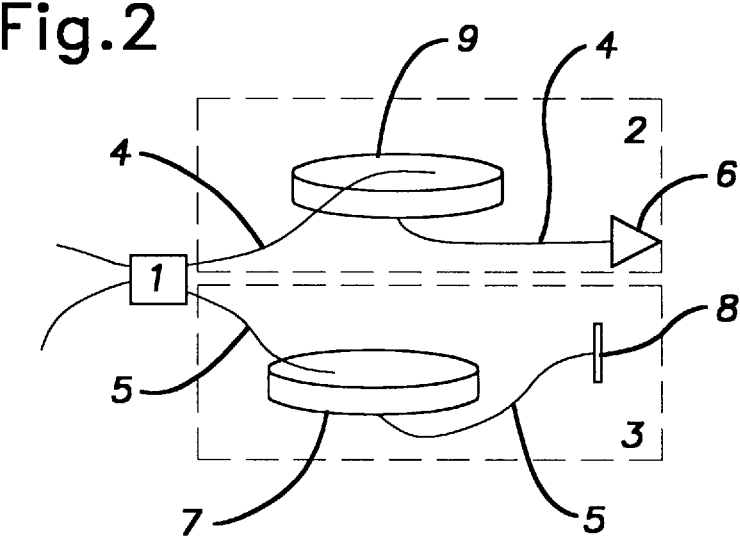

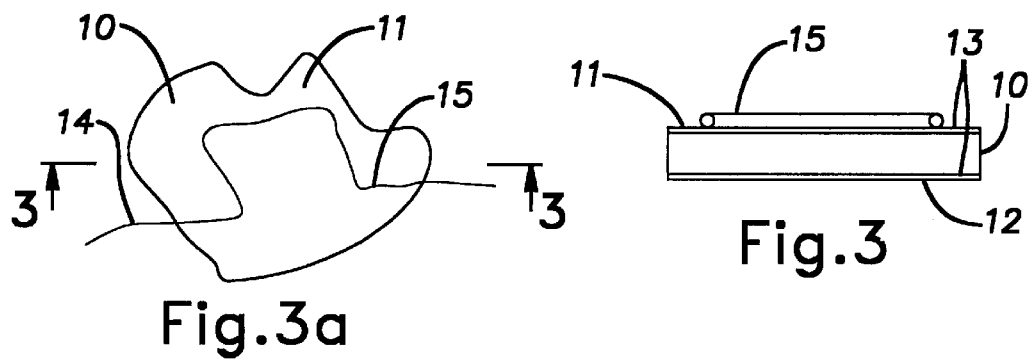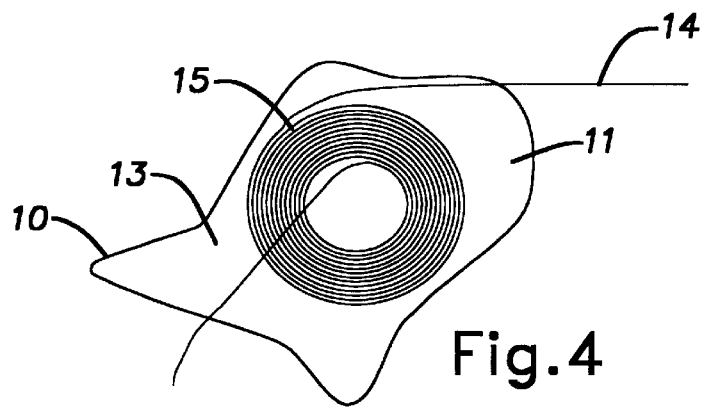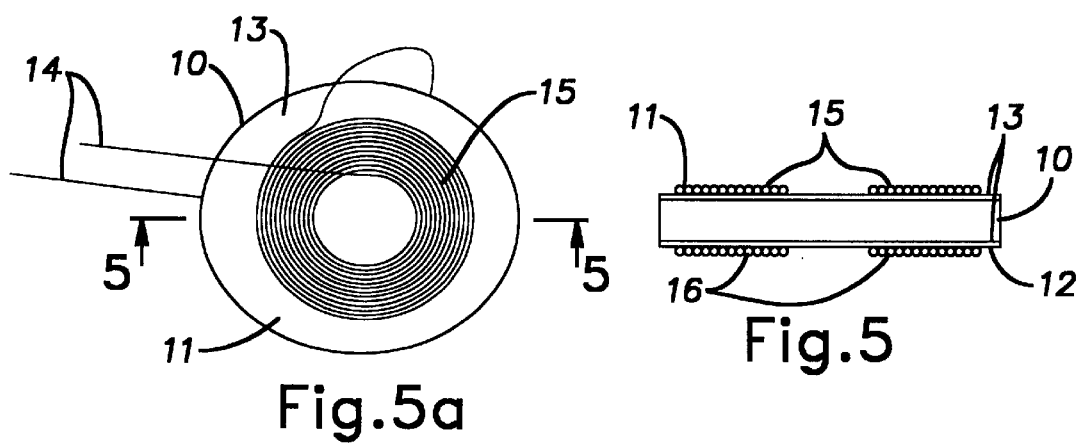

OPTICAL FIBER INTERFEROMETER AND PIEZOELECTRIC MODULATOR

This is a division of application Ser. No. 08/602,589, filed Feb. 16, 1996 now abandoned.

BACKGROUND OF THE INVENTION

The present invention relates to engineering physics, in particular, the class of devices used in the study of internal structure of objects, and can be applied for medical diagnostics of individual organs and systems of human body, as well as for industrial diagnostics, for example, control of technological processes.

DESCRIPTION OF RELATED ART

Optical fiber interferometers also find application in apparatuses designed for studies of scattering media, in particular, optical coherence tomography of biological tissues (see J. A. Izatt, J. G. Fijimoto et al., Optical coherence microscopy in scattering media, OPTICS LETTERS, vol. 19, No. 8/Apr. 15, 1994, p. 590–592, and also X. Clivaz et al., High resolution-reflectometry in biological tissues, OPTICS LETTERS, vol. 17, No. 1/Jan. 1, 1992). Both the said papers offer a description of the Michelson optical fiber interferometer commonly comprising a coupler, a sampling arm provided with an optical probe at the end, and a reference arm incorporating an optical fiber piezoelectric phase modulator with a reference mirror installed at its end. Optical length of the reference arm can be varied within a fairly wide range by means of mechanical step-by-step alteration of the reference mirror position. Incorporation of a piezoelectric modulator of phase in the interferometer arm to suit the said interferometer for optical coherence tomography applications allows for lock-in detection of the information-carrying signal, thus providing a fairly high sensitivity of measurements, and by moving the reference mirror it is possible to perform the in-depth scanning of an object under study.

Among the known optical fiber interferometers comprising two couplers, the sampling and the reference arms is the device (Patent EPO N 0 362 474 B1, 17.03.93, Patentblatt 93/11) in which an optical fiber delay line in the form of an optical fiber loop serves as reference arm, and the sampling arm comprises a phase modulator. However, the reference arm of the said interferometer has a fixed optical length, which makes it unfit for optical coherence tomography devices.

Another known optical fiber interferometer suited for the optical coherence tomography is designed as Mach-Zender interferometer (see J. A. Izatt, J. G. Fujimoto, et al., Micron-resolution biomedical imaging with optical coherence tomography, Optics & Photonic News, October 1993, vol. 4, No. 10, p. 14–19) comprising the sampling and reference arms and two beam-splitters. This interferometer is used for measurements of scattered radiation in the plane parallel to the surface of tested sample, without scanning the sample in depth, hence it does not comprise a reference mirror. Modulation of interference signal is achieved by incorporating a fiber optic piezoelectric modulator into the reference arm of the interferometer.

Another available optical fiber interferometer is designed as the Michelson interferometer having a coupler, sampling and reference arms either of which comprises an optical fiber piezoelectric modulator. The sampling arm at the end has a measuring probe, the reference arm end being provided with a reference mirror (X. J. Wang et al., Characterization of human scalp hairs by optical low coherence reflectometry, OPTICS LETTERS, vol. 20, No. 5, 1995, pp. 524–526). The signals are modulated in both arms of the said interferometer, a relative phase shift is provided by both optical fiber piezoelectric modulators. The optical length of the sampling arm is changed by moving the reference mirror.

Major disadvantage inherent in all of the above-described fiber optic interferometers is the mechanical step-by-step moving of reference mirror in order to scan a test object in depth, which does not allow to study media that typically change their properties or position to the optical probe faster than the time required to take measurements that would ensure adequate reconstruction of the profile under study. It is clear, therefore, that the in vivo investigation of tissues is quite problematic, since they have to be rigidly fixed, which is impossible in some cases like, for example, with tissues of human eye.

The above paper by J. A. Izatt, J. G. Fujimoto et al., gives a description of a fiber interferometer for optical coherence tomography, designed as the Michelson interferometer comprising a coupler, a sampling arm with a measuring probe at the end, and a reference arm whose end is provided with a reference mirror movable at a constant speed. This arrangement allows for an in depth scanning of objects, shorter sampling time than as with the step-by-step mechanism of mirror movement, and obviates the necessity for using a piezoelectric modulator, since the information-carrying signal is received in this case using a Doppler frequency shift induced in the reference arm by the constant speed movement of the reference mirror.

The closest analog of the present invention is the optical fiber interferometer incorporated in a device for optical coherence tomography (In vivo optical coherence tomography of human skin microstructure, A. Sergeev et al., Proc. SPIE, v. 2328, 1994, p. 144). The said interferometer comprises a coupler, sampling and reference arms, the sampling arm having an optical probe at the end, the reference arm incorporating a unit for changing the optical length of the said arm. This unit can be devised in the form of both an optical fiber piezoelectric modulator and a reference mirror installed at the end of the reference arm and having a capability of moving at a constant speed along the optical axis of the interferometer.

The disadvantage of the said interferometer, as of the one described by J. A. Izatt, J. G. Fujimoto et al., is that in optical coherence tomography applications for investigating internal structure of objects the mechanical system of constant speed moving of reference mirror in both these interferometers requires higher precision of mechanical scanning. Besides, in the in vivo studies of tissues the mechanical scanning system inertia sets the same limitations as the step-by-step reference mirror moving mechanism and, therefore, it is impossible to investigate the objects whose properties or position to the optical probe change in a shorter time than is required for measurements reliable enough to recover the test profile with sufficient accuracy. Varying the optical length of the fiber section of the reference arm by means of an optical piezoelectric modulator allows for faster scanning but at the expense of the scanning depth.

There is known an optical fiber piezoelectric modulator comprising a cylindrical body of plastic material having piezoelectric properties, with a coil of optical fiber embedded therein, the fiber coil axis being aligned with the longitudinal axis of the cylinder. The said modulator has electrodes deposited on the opposite ends of the cylinder (Patent application EPO N 0 356 056 A1 published 28.02.90 bul. 90/09).

Yet, since an increase in the coil diameter is directly proportional to the transverse-to-longitudinal size ratio of the cylinder, which is small for the said modulator, the optical fiber length within the cylinder can vary but by a small value (the order of units of operating wavelengths). Besides, a relatively large mass of the cylindrical body conditions its inertia. All these factors make the said fiber optic piezoelectric modulator unsuitable as means to ensure both desired depth of scanning and fast sampling rate in fiber optic interferometers.

The closest analog to the present invention is an optical fiber piezoelectric modulator according to patent application EPO N 0 460 635 A2 (published 11.12.91 bul. 91/50). The said modulator comprises a piezoceramic plate with electrodes located on the first and second opposite surfaces of the plate, and an optical fiber one part of which is fastened to one surface of the said piezoceramic plate so as to allow variation of the fiber length. This system has much less inertia and provides larger specific lengthening of optical fiber than the arrangement described above, owing to the piezoelectric part being formed as a thin disc. A large absolute lengthening of optical fiber is achieved by means of an in-series connection of a large number of piezoelectric elements.

However, this optical fiber piezoelectric modulator, being a one-plate structure, fails to provide sufficient absolute lengthening of optical fiber within the arm of interferometer used in the device for optical coherent tomography of biological tissues in vivo, and with the large quantity of the in-series-connected piezoelectric elements the modulator overall dimensions have to be increased, which essentially complicates the control system.

Thus, the present invention was devised in an attempt to construct an optical fiber interferometer providing, in the optical coherent tomography applications, a capability for investigating to sufficient depth of the media that quickly change their properties or position to the optical probe, as, for example, in the in vivo study of tissues.

Another problem to be solved by the present invention is the development of an optical fiber piezoelectric modulator suited for a fiber optic interferometer to provide a desired depth of scanning the media in which the characteristic time of changing their properties or position to an optical probe is small, as, for example, is the case of in vivo studies of tissues.

SUMMARY OF THE INVENTION

Essentially, the said fiber optic interferometer, similarly to its closest analog, comprises a coupler optically connected with the sampling and reference arms, either of which including a fiber section. The sampling arm is provided with an optical probe, and one of the arms of the said interferometer, for example, the reference one, comprises the first optical fiber piezoelectric modulator arranged so as to allow for varying the optical path of this arm.

The novelty offered by the present invention is that the first fiber optic piezoelectric modulator functions as the fiber part of the interferometer arm and is formed as a fiber optic piezoelectric controllable delay line allowing for changing the optical path of the interferometer arm by at least several tens of operating wavelengths of the interferometer.

In one embodiment, the sampling and reference arms of interferometer are designed so that their optical paths can be changed in anti-phase and, besides, one of the arms, for example, the sampling one, comprises a second (additional) piezoelectric modulator.

In a different embodiment the fiber part of the interferometer sampling arm is constructed similarly to the fiber part of the reference arm.

In the particular embodiment the optical fiber interferometer is based on anisotropic fiber.

Essentially, the developed optical fiber piezoelectric modulator, as its closest analog, comprises a piezoceramic plate having electrodes arranged on its first and second opposite surfaces, and an optical fiber whose first part is fastened to the first surface of the piezoceramic plate to allow variation of the fiber length.

The novelty of the present fiber optic piezoelectric modulator is that it is constructed in the form of a fiber optic piezoelectric controllable delay line, with the length of the first part of the optical fiber exceeding diameter of the said piezoceramic plate.

In one embodiment the first part of the optical fiber is arranged in the form of a coil on the first surface of the piezoceramic plate.

In a different embodiment the first part of the optical fiber is arranged so that its entire length is fastened to the first surface of the piezoceramic plate.

In another embodiment the second part of the optical fiber is fastened to the second surface of the piezoceramic plate.

In a different embodiment the length of the second part of optical fiber exceeds the diameter of the piezoceramic plate.

In the particular embodiment the second part of optical fiber is arranged in the form of a coil.

In another particular embodiment the second part of the optical fiber is fastened over the entire length to the second surface of the piezoceramic plate.

In a different particular embodiment a piezoceramic plate is formed as disc.

In particular embodiments the modulator is made with or using anisotropic fiber.

In the present fiber optic interferometer an optical fiber piezoelectric modulator in the form of an optical fiber delay line serves as the fiber part of the interferometer arm, which ensures a desired technical result, i.e., possibility to provide a practically inertialess, high-rate alteration of the interferometer optical path thus changing the difference in the optical paths of the arms by at least several tens of operating wavelengths of the said interferometer. This effect allows to apply the said fiber optic interferometer in the studies of media that typically change their characteristics or position to the optical probe in a very short time (about a second). Having the sampling and reference arms designed so as to provide anti-phase variation of their optical paths, and having the other arm's function also performed by an optical fiber piezoelectric modulator in the form of fiber optic controllable delay line enhances the technical result. Similar fib arrangements in the sampling and the reference arms of the interferometer allows to double the scan depth of an object under study without incorporating precise mechanical elements in the interferometer, the scanning control being made easier thereby.

The optical fiber piezoelectric modulator of the invention has been constructed as optical fiber piezoelectric controllable delay line, the optical fiber length exceeding diameter of the plate, the said fiber being fastened to two surfaces of the plate formed as disc, the fiber being arranged in the form of a coil and fastened over the entire length to the plate surface. This arrangement ensures a desired technical objective, i.e., possibility for changing the length of optical fiber within a wide range given absence of inertia and low overall dimensions of the modulator. This capability allows application of the said modulator in a fiber optic interferometer to provide a desired depth of scanning in media having small characteristic time of change in their properties and position to optical probe, like, for example, in the in vivo studies of tissues.

BRIEF DESCRIPTION OF THE DRAWINGS

Some particular embodiments of the invention will now be described with reference to the accompanying drawings, in which:

FIGS. 1, 2 are schematic designs of the optical fiber single-mode interferometer of the invention as defined in claims 1 and 3 as filed.

FIGS. 3, 3a, 4, 5 and 5a depict particular embodiments of the developed optical fiber piezoelectric modulator (FIG. 3a is a top view and FIG. 3 is a cross-sectional view taken along line 3—3 of FIG. 3a of the modulator as claimed in claim 7 as filed, FIG. 4 is a top view of the modulator as claimed in claim 8 as filed, FIG. 5a is a top view and FIG. 5 is a cross-sectional view taken along line 5—5 of FIG. 5a of one particular embodiment of the modulator as claimed in claim 15 as filed).

DESCRIPTION OF THE PREFERRED EMBODIMENTS

As depicted in FIG. 1, the optical fiber interferometer is constructed in the form of Michelson interferometer comprising optically coupled coupler 1 and sampling and reference arms 2, 3, respectively, incorporating fibers 4, 5, respectively. The sampling arm 2 is provided at the end with optical probe 6, and the reference arm 3 comprises optical fiber piezoelectric modulator 7. The optical fiber piezoelectric modulator 7 functions as the fiber 5 of the interferometer arm 3 and is arranged in the form of the optical fiber delay line in which a capability is provided for varying the optical length of arm 3 by at least several tens of operating wavelengths of the said interferometer. The reference arm 3 is ended with a stationary reference mirror 8. The interferometer also comprises a source of control voltage applied to the optical fiber piezoelectric modulator 7 (it is not depicted in the drawing). FIG. 2 shows an optical fiber Michelson-type interferometer having a coupler 1 optically connected with sampling and reference arms 2, 3, respectively, which comprise fibers 4, 5, respectively. The sampling arm 2 is provided at the end with optical probe 6, the reference arm 3 incorporates a stationary reference mirror 8. The sampling and reference arms 2, 3 have fiber optic piezoelectric modulators 9, 7, respectively, which perform the function of the fibers 4, 5, respectively, either of the said modulators being constructed in the form of optical fiber controllable delay line, which allows for changing the optical length of the respective arm by at least several tens of operating wavelengths of the interferometer (for example, as claimed in original claims 7–16).

The said interferometer also comprises a control voltage source to which the optical fiber piezoelectric modulators 7, 9 are connected in antiphase (this is not shown in the drawing).

The fiber optic piezoelectric modulator as shown in FIGS. 3a and 3 comprises a piezoceramic plate 10 with the electrodes 13 located on the opposite surfaces 11, 12 of the said plate. The modulator also comprises an optical fiber 14, its first part 15 being arranged on the first surface 11 of the piezoceramic plate 10 so as to allow variation of the fiber length. The length of the first part 15 of the optical fiber 14 is larger than diameter of the piezoceramic plate 10.

As depicted in FIG. 4, the first part 15 of the optical fiber 14 is arranged in the form of a coil within the optical piezoelectric modulator.

The optical piezoelectric modulator as shown in FIGS. 5a and 5 has the optical fiber 14 fastened to the first surface 11 and the second surface 12 of the piezoceramic plate 10. The length of the first and second parts 15, 16, respectively, of the optical fiber 14 exceeds diameter of the piezoceramic plate 10. The first and the second parts 15, 16, respectively, are arranged in the form of a coil. The piezoceramic plate 10 is a disc in the optical fiber piezoelectric modulator in FIGS. 5a and 5.

In a particular embodiment the first part 15 of the optical fiber 14 is fastened over the entire length on the first surface 11 of the piezoelectric plate 10 (not shown in the drawing).

In another particular embodiment the second part 16 of the optical fiber 14 is fastened over the entire length on the second surface 12 of the piezoceramic plate 10 (not shown in the drawing).

The optical fiber 14 as well as the fibers 4, 5 of the arms 2, 3, respectively, in the optical fiber interferometer of the invention may be a PANDA-type optical fiber.

The piezoelectric plate 10 may be made of a piezoelectric material exhibiting a strong perpendicular inverse piezoeffect, for example, of PZT-5 type.

The ratio of the plate 10 diameter to its thickness has to be chosen so as to provide a desired lengthening of the first and/or second parts 15, 16 of the optical fiber 14, with account of the particular configuration of the first and/or the second parts 15, 16 of the optical fiber 14.

The electrodes 12, 13 are metal, for example, silver. The optical probe 6 is essentially a lens system that serves for radiation focusing onto a test object and for guiding the scattered radiation back into the sampling arm 2, and must be optically connected with the fiber part 4 of the sampling arm 2.

The optical fiber interferometer of the invention, as depicted in FIG. 1, operates as follows.

The input radiation passes to coupler 1, the coupler 1 provides coupling of the radiation to both arms 2, 3 of the interferometer. The radiation is transmitted through the fiber part 4 of the sampling arm 2 to the optical probe 6, and through the fiber 5 of the reference arm 3 to the reference mirror 8. The optical probe 6 focuses the radiation on the test object and simultaneously guides back into the fiber 4 of the sampling arm 2 of the interferometer, while the reference mirror 8 reflects the incident radiation backward into the fiber 5 of the reference arm 3. The radiation scattered from the test object is transmitted through the fiber 4 of the sampling arm 2 to the coupler 1 where it interferes with the radiation arriving on the coupler 1 after being reflected by the reference mirror 8, via the fiber 5 of the reference arm 3. The function of the fiber 5 of the reference arm 3 is performed by the optical fiber piezoelectric modulator 7. Since the said modulator 7 is constructed in the form of an optical fiber controllable delay line to provide for variation of the optical path of the reference arm 3 by at least several tens of operating wavelengths of the interferometer, then, driven by the control voltage (not shown in the drawing), the said modulator 7 provides a change in the optical path of the reference arm 3 of the interferometer and, hence, a change in the difference of optical paths of the sampling and reference arms 2, 3 of the said interferometer by the rule of the control voltage, within the limits required for scanning a test object in depth. When the optical fiber interferometer as depicted in FIG. 1 is used in the device for optical coherence tomography, the information parameter will be the dependence of the interference signal intensity on the difference between optical lengths of the interferometer arms.

The optical fiber interferometer as shown in FIG. 2 operates similarly to that in FIG. 1. In this embodiment the function of the fiber part 4 of the sampling arm 2 is performed by the second optical fiber piezoelectric modulator 9, arranged in the form of optical fiber controllable delay line which allows for varying the optical length of the sampling arm 2 by at least several tens of operating wavelengths of the said interferometer. Therefore, under the control voltage (not shown in the drawing) both the piezoelectric modulators 9, 7 connected to the control voltage source in antiphase provide, in compliance with the rule of control voltage variation, a change in the difference between optical paths of the sampling and reference arms 2, 3 of the interferometer, within the range twice that for the embodiment as shown in FIG. 1.

The optical fiber piezoelectric modulator depicted in FIGS. 3, 3a, 4, 5 and 5a operates as follows.

The optical fiber piezoelectric modulator is constructed in the form of an optical fiber piezoelectric controllable delay line. The control voltage from the source (not shown in the drawing) is applied to electrodes 13 which produce a difference in the potentials (φ) on the first and second surfaces 11, 12 of the piezoelectric plate 10, causing a perpendicular inverse piezoelectric effect in the plate 10. The absolute variation (ΔR) of diameter of the first surface 11 of plate 10 is defined by the following expression:

$$\Delta R = \frac{R}{2h} d_{33}\phi$$

where R is the half-diameter of the first surface 11 of the plate 10; h is the thickness of plate 10; $d_{33}$ is the piezoelectric modulus.

An increase in the area of the first surface 11 of plate 10 according to the rule of control voltage variation, causes stretching the first part 15 of the optical fiber 14 arranged on the said surface. Since the length of the first part 15 of optical fiber 14 exceeds diameter of the first surface 11 of the piezoceramic plate 10, the absolute lengthening of the first part 15 of optical fiber 14 is greater than ΔR and depends on the form the fiber is arranged on the first surface. According to the above expression, for an absolute lengthening of fiber by a value close to 1.5 mm it, about 15 m of optical fiber have to be arranged on the first surface 11 of the plate 10.

In the optical fiber piezoelectric modulator as shown in FIG. 4 the first part 15 of optical fiber 14 is arranged in the form of a coil. Therefore, absolute lengthening of the first part 15 of optical fiber 14 and, hence, its optical length may vary within the limits of at least several tens of radiation wavelengths in compliance with the rule of control voltage variation. This allows application of the optical fiber piezoelectric modulator in the optical fiber interferometer of the invention for providing a desired depth of scanning the media that change their properties and position to optical probe in a very short time, as, for example, is the case of the in vivo studies of tissues. In the embodiment depicted in FIGS. 5a and 5 the coil-like form of arranging the first and the second parts 15, 16 of optical fiber 14 on both surfaces 11, 12 of plate 10 allows to extend the scanning area into the depth of a test object.

Although the preferred embodiments of the invention have been shown and described, it should be understood that various modifications and rearrangements of the parts may be resorted to without departing from the scope of the invention as disclosed and claimed herein.

What is claimed is:

1. An optical fiber piezoelectric modulator comprising a piezoceramic plate with electrodes and an optical fiber having a length, said plate exhibiting a perpendicular inverse piezoeffect and having an electric field vector when an electric field is applied to said electrodes, said plate having a thickness in a direction substantially aligned with said electric field vector and having a width in a direction substantially perpendicular to said electric field vector, said thickness being substantially smaller than said width, a first part of said fiber (a) having a length and (b) being mechanically connected with said plate effective to allow changing of the length of said fiber by at least several tens of wavelengths of light when said light is present in said fiber, the length of said first tart of said fiber substantially exceeding the width of said plate.

2. An optical fiber piezoelectric modulator as claimed in claim 1, said plate having first and second opposite surfaces, said electrodes being located on said first and second opposite surfaces of said plate, said first fiber part being mechanically connected to said first surface of said plate.

3. An optical fiber piezoelectric modulator as claimed in claim 2, said optical fiber having a second part different from said first part, said second part of said fiber being mechanically connected to said second surface of said plate.

4. An optical fiber piezoelectric modulator as claimed in claim 3, said second part of said fiber having a length, said length of said second part of said fiber exceeding the width of said plate.

5. An optical fiber piezoelectric modulator as claimed in claim 4, said second part of said fiber being arranged in a form of a coil.

6. An optical fiber piezoelectric modulator as claimed in claim 5, said first part of said fiber being arranged in a form of a coil, said plate having the shape of a disc, a first electrode being located on said first surface of said plate, said first electrode being positioned between said first fiber part and said plate, a second electrode being located on said second surface of said plate, said second electrode being positioned between said second fiber part and said plate, said width being at least several times said thickness.

7. An optical fiber piezoelectric modulator as claimed in claim 3, a second electrode being located on said second surface of said plate, said second fiber part being fastened to said second electrode.

8. An optical fiber piezoelectric modulator as claimed in claim 7, said second electrode being positioned between said second fiber part and said plate.

9. An optical fiber piezoelectric modulator as claimed in claim 3, said second part of said fiber being arranged in a form of a coil.

10. An optical fiber piezoelectric modulator as claimed in claim 3, said second part of said fiber having an entire length, said second part being mechanically connected over said entire length to said second surface of said plate.

11. An optical fiber piezoelectric modulator as claimed in claim 2, a first electrode being located on said first surface of said plate, said first fiber part being fastened to said first electrode.

12. An optical fiber piezoelectric modulator as claimed in claim 11, said first electrode being positioned between said first fiber part and said plate.

13. An optical fiber piezoelectric modulator as claimed in claim 2, wherein said first part of said fiber is arranged in a form of a coil.

14. An optical fiber piezoelectric modulator as claimed in claim 13, wherein said first part of said fiber is coiled at least 13 times.

15. An optical fiber piezoelectric modulator as claimed in claim 2, said width being at least several times said thickness.

16. An optical fiber piezoelectric modulator as claimed in claim 2, said first part of said fiber having an entire length, said first part being mechanically connected over said entire length to said first surface of said plate.

17. An optical fiber piezoelectric modulator as claimed in claim 1, wherein said plate has the shape of a disc.

18. An optical fiber piezoelectric modulator as claimed in claim 1, wherein said optical fiber is anisotropic fiber.

19. An optical fiber piezoelectric modulator as claimed in claim 1, each of said electrodes being flat.

20. An optical fiber piezoelectric modulator as claimed in claim 1, wherein said optical fiber is PANDA-type optical fiber.

21. An optical fiber piezoelectric modulator as claimed in claim 1, said first part of said fiber having a length of at least 15 meters.

* * * * *

UNITED STATES PATENT AND TRADEMARK OFFICE
CERTIFICATE OF CORRECTION

PATENT NO. : 5,835,642
DATED : November 10, 1998
INVENTOR(S) : Valentin M. Gelikonov, et al.

It is certified that error appears in the above-indentified patent and that said Letters Patent is hereby corrected as shown below:

Column 1, line 22, "resolution-reflectometry" should be --resolution reflectometry--.

Column 5, line 44, "Fig. 2 shows an optical fiber Michelson-type" should begin a new paragraph on line 45.

Column 5, line 46, "having a coupler 1 optically connected with sampling and" should follow --interferometer-- in line 45.

Column 8, line 19, "tart" should be --part--.

Signed and Sealed this

Thirtieth Day of March, 1999

Attest:

Q. TODD DICKINSON

*Attesting Officer*   *Acting Commissioner of Patents and Trademarks*